Aug. 25, 1959     M. J. GILPATRICK     2,901,288
HOPPER TRUCK
Filed Dec. 23, 1955                    2 Sheets-Sheet 1

INVENTOR
MARK J. GILPATRICK
BY Scrivener & Parker
ATTORNEYS

Aug. 25, 1959   M. J. GILPATRICK   2,901,288
HOPPER TRUCK

Filed Dec. 23, 1955   2 Sheets-Sheet 2

INVENTOR
MARK J. GILPATRICK

BY Scrivener + Parker
ATTORNEYS

United States Patent Office 2,901,288
Patented Aug. 25, 1959

2,901,288

HOPPER TRUCK

Mark J. Gilpatrick, Riverton, Wyo., assignor to Gilpatrick Construction Company, Riverton, Wyo., a partnership Application December 23, 1955, Serial No. 555,138

2 Claims. (Cl. 298—30)

This application is a continuation-in-part of my co-pending application Serial No. 366,436, filed July 7, 1953, now Patent Number 2,800,363, issued July 23, 1957, for Trailer Vehicle for Bulk Material Such as Earth, Sand and Gravel.

The invention described and claimed in this and my co-pending applications relate to wheeled trailer vehicles of the hopper variety adapted and intended for the transportation of such bulk materials as earth, sand and gravel, such vehicles being of the general type having an open top and a bottom gate through which material within the vehicle may be dumped.

In my co-pending application there is described and claimed a wheeled trailer vehicle having a pivoted bottom gate which may be opened to dump material from the body of the trailer, and novel and improved operating means for the gate. In the embodiment of the invention disclosed in the co-pending application the gate is pivoted at its upper edge to the front wall of the vehicle at the upper edge of the dump opening and is moved from closed to open position by a lever system which is so constructed and operative that in the closed position of the gate the weight of material within the vehicle resting on the gate holds the lever system in a locked, toggle-over position in which the gate is held closed. The gate-operating mechanism additionally includes spring means which constantly urge the gate to closed position.

The invention described and claimed herein constitutes an improvement of the gate-supporting and gate-operating means of the co-pending application and has for its principal object the provision of means for supporting and operating the gate which increases and makes more effective the locking of the gate in closed position by the weight of material resting on it. A further object of the invention has been to provide a gate-supporting and gate-operating mechanism having the described improved gate-locking feature and effect, but not requiring the spring which forms part of the mechanism disclosed in the co-pending application.

A preferred form which the invention may take is described in the following specification and illustrated in the accompanying drawings, in which.

Figure 1:
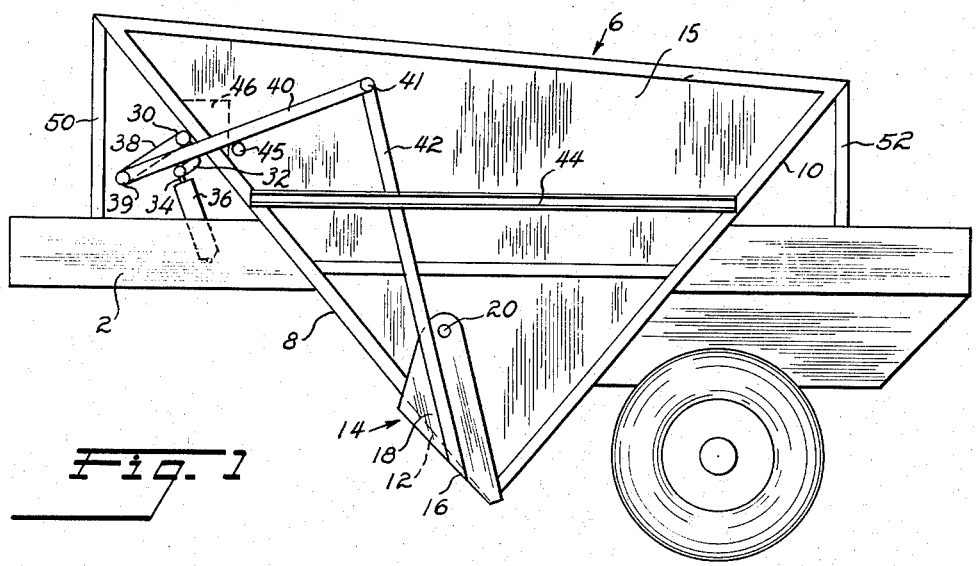
Fig. 1 is a side view of a wheeled trailer vehicle showing the gate-supporting and gate-operating means provided by the invention, the gate and its operating mechanism being shown in gate-closed position.

A wheeled trailer vehicle constructed in accordance with my invention is disclosed in the accompanying drawings and comprises a frame having laterally spaced I-beams 2 which extend throughout the length of the vehicle and, at the rear ends thereof, are supported by wheels 4 and, at the front ends thereof, are adapted to be supported by the rear end of a tractor vehicle (not shown). The spaced I-beams 2 support a body 6 which is V-shaped when viewed from the side, having front wall 8 and rear wall 10, which converge from the open top of the body downwardly to a point just above the ground surface, and side walls 15. The lower end of the rearwardly-inclined front wall 8 terminates above the lower end of the forwardly-inclined rear wall 10, leaving an opening 12 at the bottom of the front wall through which the bulk material within the vehicle may be dumped, and which is opened and closed by a gate 14. The gate 14 comprises a front plate 16 which is slightly wider than the dump opening 12 and is adapted to cover the opening when the gate is in closed position, and side plates 18 which extend, respectively, rearwardly from the side edges of the front plate 16 and are adapted to slide over and outside the side body walls 15 as the gate is opened and closed.

In accordance with the present invention, new and improved means are provided for pivotally supporting the gate on the vehicle body for movement to positions in which the dump opening 12 is opened or closed. These means comprise pivotal connections 20 between the side walls 15 of the vehicle body and the side plates 18 of the gate, and these pivotal connections are aligned transversely of the vehicle body and are spaced rearwardly of the front wall 8 of the vehicle body and preferably above the upper edge of the dump opening 12 so that when the door is in its open position of Fig. 2 its weight tends to move the gate towards its closed position of Fig. 1. Obviously the specific pivotal connections may take any desired form and construction, so long as they permit pivotal or swinging movement of the gate on and with respect to the body of the vehicle.

Means are provided for operating the gate 14 to open and close the dump opening 12. These means comprise a trip shaft 30 which is rotatably mounted at the upper part of the front body wall 8, on the outside thereof, and which extends across the body 6 and terminates outside the side walls 15. A bell crank 32 has its one arm connected to this shaft and the other arm connected to the upper end of the piston rod 34 of an hydraulic actuator. A lever arm 38 is rigidly connected at its one end to the trip shaft 30 and extends forwardly from the shaft in the closed position of the gate and has its outer end pivotally connected at 39 to one end of a link 40 which extends rearwardly therefrom beyond the trip shaft 30 and lies outside of, and parallel to, one side wall 15 of the body of the vehicle. The rear end of the link 40 is pivotally connected at 41 to the upper end of a gate-operating arm 42 the lower end of which is rigidly connected to one side plate 18 of the gate 14. An elongated bar 44 is mounted in outwardly-spaced relation on the side wall 15 of the vehicle and the gate arm 42 is disposed between the side wall and this bar which thereby forms a guide for the gate arm as it moves back and forth in operating the gate.

The lever 38 and link 40 form an over center toggle and when in the closed or retracted position of Fig. 1 the pivot 39 is below the trip shaft 30 with the link 40 engaging a stop 45 fixed to the side walls of the body. With this arrangement a force acting on the door tending to open it would exert a counterclockwise force on link 38 whose movement would be prevented by the stop 45 so that the door is effectively releasably locked in its closed position. When the toggle is broken by movement of the pivot 39 above shaft 30, as by the extension of the piston rod 34 causing bell crank 32 to rotate shaft 30 clockwise, the toggle moves to the extended door-open position of Fig. 2 where the toggle is releasably locked in door-open position by engagement of arm 38 with the aforementioned stop 45. A suitable recess 46 may be provided in the front wall 8 of the body to accommodate crank 32 when in the position of Fig. 2 and as shown, struts 50—52 may be provided between the inclined walls 8, 10 respectively and the I-beam 2 to provide additional support for the inclined walls.

In the use and operation of a wheeled hopper vehicle according to my invention, when the gate 14 is in the closed position of Fig. 1 and the body is loaded with bulk material such as earth, gravel or the like, the gate is securely locked in closed position by the weight of the material acting on gate 14 and hence on arm 42 to force link 40 against a stop 45. When it is desired to dump the material, shaft 30 is rotated clockwise by extension of piston rod 34 until the bell crank 32 has caused shaft 30 to raise the pivot point 39 above the shaft at which point the weight of the material acting on the gate 14 and on arm 42 rapidly move the toggle without the need of further power to its extended position of Fig. 2, where the toggle effectively locks the gate 14 in fully opened position as above explained to dump the material. As the material flows through the opening its lateral spread is controlled by the gates side plates 18 and the door in its fully opened and locked position can be used to smooth the dumped material by suitable maneuvering of the tractor vehicle.

Figure 2:
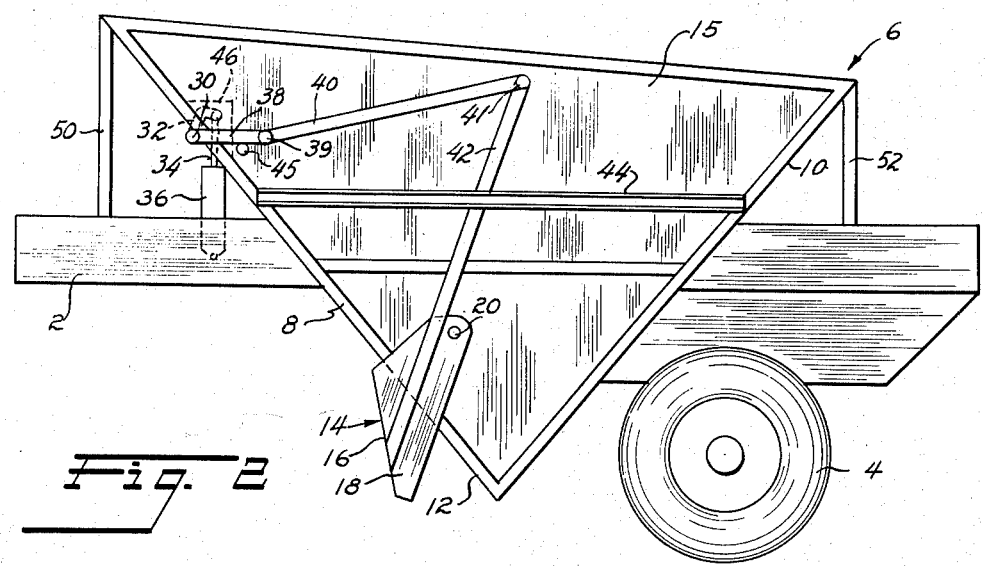
Fig. 2 is a view which is similar to Fig. 1 but shows the gate and its operating mechanism in gate-open position.
Figure 3:
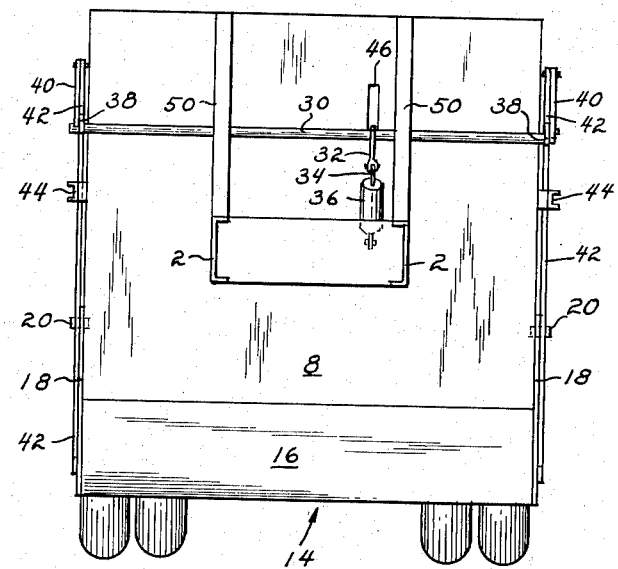
Fig. 3 is a front elevational view of the trailer vehicle.

An important feature of the invention resides in the automatic closing of the gate 14 and return of the toggle to retracted door-closed position by use of the weight of the door. As previously mentioned and as shown in Fig. 2, the pivotal supports 20 for the gate 14 are so located between the vehicles side walls 14 and the gate side plates 18 that when the door is in its open position, its weight tends to swing the door about its pivots towards its closed position. This is accomplished by locating the pivots rearwardly of the center of gravity of the door when in its open position so that when the toggle is again broken in its fully extended position of Fig. 2 by extension of piston rod 34 the door 14, swinging by the force of gravity counter-clockwise in Fig. 2, forces the toggle to its retracted position of Fig. 1 where the toggle is again locked as above explained.

A hopper door hung so as to be automatically closed by its own weight in combination with an over-center toggle provides economical means for moving and locking a hopper door between its opened and closed positions. Not only does the arrangement of the invention eliminate the necessity of springs, but movement of the gate is extremely rapid and it is almost entirely automatic after the toggle is moved past dead center from either of its locking positions. In addition, by mounting the gate with pivotal supports which are through the side walls rearwardly of the openings in the front walls the lower edge of the gate in opened position is substantially on a horizontal line with the lower edge of the rear wall while at the same time the gate opening is considerably increased over that shown in my co-pending application, now Patent No. 2,800,363.

While I have described and illustrated one embodiment of my invention, it will be apparent to those skilled in the art that other embodiments, as well as modifications of that described, may be made and practiced without departing in any way from the spirit or scope of the invention, for the limits of which reference must be made to the appended claims.

What is claimed is:

1. A hopper vehicle comprising a body having spaced parallel side walls and downwardly converging front and rear walls, the front wall terminating at its lower end above the lower edge of the rear wall to provide a dump opening, a gate for said opening comprising a flat plate and side plates projecting towards the rear of said body from the side edges of said flat plate, each of said side plates having a part overlying a part of said side walls, a pivotal connection between each side wall of said body and the adjacent side wall of the plate, said pivotal connections being transversely aligned and spaced rearwardly of the front wall of the vehicle and above the bottom edge of the dump opening, a gate operating arm rigidly connected at its lower end to the plate and extending upwardly therefrom, a lever arm pivotally mounted at its one end on the body above the gate, a link pivotally connected at its ends to the opposite end of the lever arm and to the upper end of the gate operating arm, and means for rotating said lever about said pivot on said body so as to cause said link to operate on said lever arm so as to move said gate between open or closed position.

2. A hopper vehicle comprising a body having side walls and downwardly converging front and rear walls, the front wall terminating at its lower end above the lower edge of the rear wall to provide an opening, a gate for said opening comprising a flat plate having side plates projecting toward the rear of said body from the side edges of said plate, each side plate having a part overlying a side wall of said body, pivotal connections between said side plates and said side walls rearwardly of said front wall for swingably supporting said gate for movement between open and closed positions, said pivotal connections being spaced rearwardly of the center of gravity of the gate so that said gate when in opened position is urged by the force of gravity towards its closed position, a gate operating arm rigidly connected at one end to said gate and having its opposite end extending upwardly in parallel relationship to a side wall of said body, a pair of over-center toggle links pivotally connected at their adjacent ends and having their respective opposite ends pivotally connected to said gate operating arm to a fixed pivot adjacent the front wall of said body, said toggle links in extended position acting on said operating arm to releasably lock said gate in open position and in retracted position acting on said arm to releasably lock said gate in closed position, and means for breaking said toggle when in either of its two positions, the weight of said door acting to move said toggle to door-closed position when said toggle is broken in an extended door-open position.

References Cited in the file of this patent

UNITED STATES PATENTS

| | | |
|---|---|---|
| 714,482 | Haywood | Nov. 25, 1902 |
| 899,011 | Haywood | Sept. 15, 1908 |
| 1,111,532 | Frame et al. | Sept. 22, 1914 |
| 1,122,394 | Hughes | Dec. 29, 1914 |
| 1,418,402 | Scott | June 6, 1922 |
| 1,935,974 | Burner | Nov. 21, 1933 |
| 1,961,193 | Brumbaugh | June 3, 1934 |
| 2,162,353 | McVicker | June 13, 1939 |
| 2,479,800 | Williams | Aug. 23, 1949 |

FOREIGN PATENTS

| | | |
|---|---|---|
| 164,658 | Great Britain | June 16, 1921 |